(12) United States Patent
Thomas et al.

(10) Patent No.: US 10,950,105 B2
(45) Date of Patent: Mar. 16, 2021

(54) AUTONOMOUS SENSOR PLACEMENT DISCOVERY METHOD AND APPARATUS

(71) Applicant: Intel Corporation, Santa Clara, CA (US)

(72) Inventors: Scott Thomas, Gilbert, AZ (US); Daniel Gutwein, Phoenix, AZ (US); John Belstner, Scottsdale, AZ (US); Daniel Stokes, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/147,290

(22) Filed: Sep. 28, 2018

(65) Prior Publication Data

US 2019/0043328 A1 Feb. 7, 2019

(51) Int. Cl.
| | | |
|---|---|---|
| *G08B 13/00* | (2006.01) | |
| *G08B 13/24* | (2006.01) | |
| *G06K 17/00* | (2006.01) | |
| *G06K 19/14* | (2006.01) | |
| *H04W 64/00* | (2009.01) | |
| *G06Q 10/08* | (2012.01) | |
| *G06K 7/10* | (2006.01) | |

(52) U.S. Cl.
CPC ..... *G08B 13/2402* (2013.01); *G06K 7/10009* (2013.01); *G06K 7/10475* (2013.01); *G06K 17/0022* (2013.01); *G06K 19/145* (2013.01); *G06Q 10/087* (2013.01); *G08B 13/2462* (2013.01); *G08B 13/2474* (2013.01); *H04W 64/003* (2013.01)

(58) Field of Classification Search
CPC ............ G08B 13/2402; G08B 13/2462; G08B 13/2474; G06K 7/10009; G06K 17/002; G06K 19/145; G06Q 10/087; H04W 64/003
USPC .......................... 340/10.1–10.5, 572.1–572.9
See application file for complete search history.

(56) References Cited

U.S. PATENT DOCUMENTS

| | | | |
|---|---|---|---|
| 10,070,265 B1 * | 9/2018 | Maricic .................. | H04L 67/02 |
| 2004/0239498 A1 * | 12/2004 | Miller .................. | G08B 25/016 |
| | | | 340/539.13 |
| 2007/0290924 A1 * | 12/2007 | McCoy ................ | G06Q 10/087 |
| | | | 342/464 |

(Continued)

FOREIGN PATENT DOCUMENTS

GB 2549167 A * 10/2017

*Primary Examiner* — Ojiako K Nwugo
(74) *Attorney, Agent, or Firm* — Schwabe, Williamson & Wyatt, P.C.

(57) ABSTRACT

Systems, apparatuses, and methods for autonomous sensor placement discovery for RFID systems are disclosed. Sensors are deployed in a brick and mortar store that can scan for and receive signals from a plurality of locating tags as well as RFID tags. The locating tags may transmit ultra-wideband signals in response to a scan to provide precise determination of the location of each locating tag relative to a detecting sensor. Each sensor may also include a locating tag to enable determining the location of each sensor. The location information from the locating tags is provided to a gateway, which can provide a display of the locations of sensors and locating tags in the brick and mortar store and areas of no coverage, as well as autonomously control various parameters of the sensors to minimize or eliminate some or all areas of no coverage.

17 Claims, 9 Drawing Sheets

(56) References Cited

U.S. PATENT DOCUMENTS

| | | | |
|---|---|---|---|
| 2008/0165012 A1* | 7/2008 | Choi | G06K 7/0008 |
| | | | 340/572.7 |
| 2011/0050732 A1* | 3/2011 | Arrasvuori | G06Q 30/0261 |
| | | | 345/666 |
| 2014/0125461 A1* | 5/2014 | Liao | G01S 5/02 |
| | | | 340/10.1 |
| 2014/0167918 A1* | 6/2014 | Stern | G06K 7/0095 |
| | | | 340/10.1 |
| 2016/0260301 A1* | 9/2016 | Miller | G08B 13/2417 |
| 2016/0307007 A1* | 10/2016 | Narasimha | H04W 12/06 |
| 2017/0016976 A1* | 1/2017 | Simon | G01S 1/042 |
| 2017/0041452 A1* | 2/2017 | Amann | G06Q 10/087 |
| 2017/0168135 A1* | 6/2017 | Want | G01S 11/16 |
| 2018/0107969 A1* | 4/2018 | Trivelpiece | G06Q 10/08 |
| 2018/0196972 A1* | 7/2018 | Lu | H04W 52/0274 |
| 2019/0007809 A1* | 1/2019 | Frey | G01S 5/02 |
| 2019/0102727 A1* | 4/2019 | Trivelpiece | G06K 7/10366 |
| 2019/0108370 A1* | 4/2019 | Trivelpiece | G06K 7/10029 |
| 2019/0179003 A1* | 6/2019 | Trivelpiece | H04W 4/029 |
| 2019/0212152 A1* | 7/2019 | Haverinen | G01C 21/14 |

* cited by examiner

NON-TRANSITORY COMPUTER-READABLE STORAGE MEDIUM
1202

PROGRAMMING INSTRUCTIONS 1204

CONFIGURED TO CAUSE A DEVICE, IN RESPONSE TO EXECUTION OF THE PROGRAMMING INSTRUCTIONS, TO PRACTICE (ASPECTS OF) EMBODIMENTS OF THE PROCESS(ES) OF FIGURES 1-9.

FIG. 10

AUTONOMOUS SENSOR PLACEMENT DISCOVERY METHOD AND APPARATUS

TECHNICAL FIELD

Embodiments described herein generally relate to inventory management systems useful for brick and mortar facilities. In particular, systems, apparatuses, and methods for autonomously calibrating RFID detection systems are disclosed.

BACKGROUND

Many brick and mortar facilities, such as shops and warehouses, have a need to track and control inventory. Many use radio frequency identification (RFID) tags, attaching them to inventory items, as well as shelves and other fixtures. Typically, the RFID tags respond with a radio signal when scanned by a sensor, the radio signal including an identification code unique to at least the system with which the RFID tag is used. A receiver, which may be separate from or integrated with the sensor, receives this radio signal with the identification code in response to a scan. The unique identification code of each RFID tag may be entered into a database in connection with a product, allowing the inventory to be tracked.

BRIEF DESCRIPTION OF THE DRAWINGS

FIG. 10 illustrates a storage medium having instructions for practicing methods described with references to FIGS. 1-8, according to various embodiments.

DESCRIPTION OF EMBODIMENTS

Figure 1:
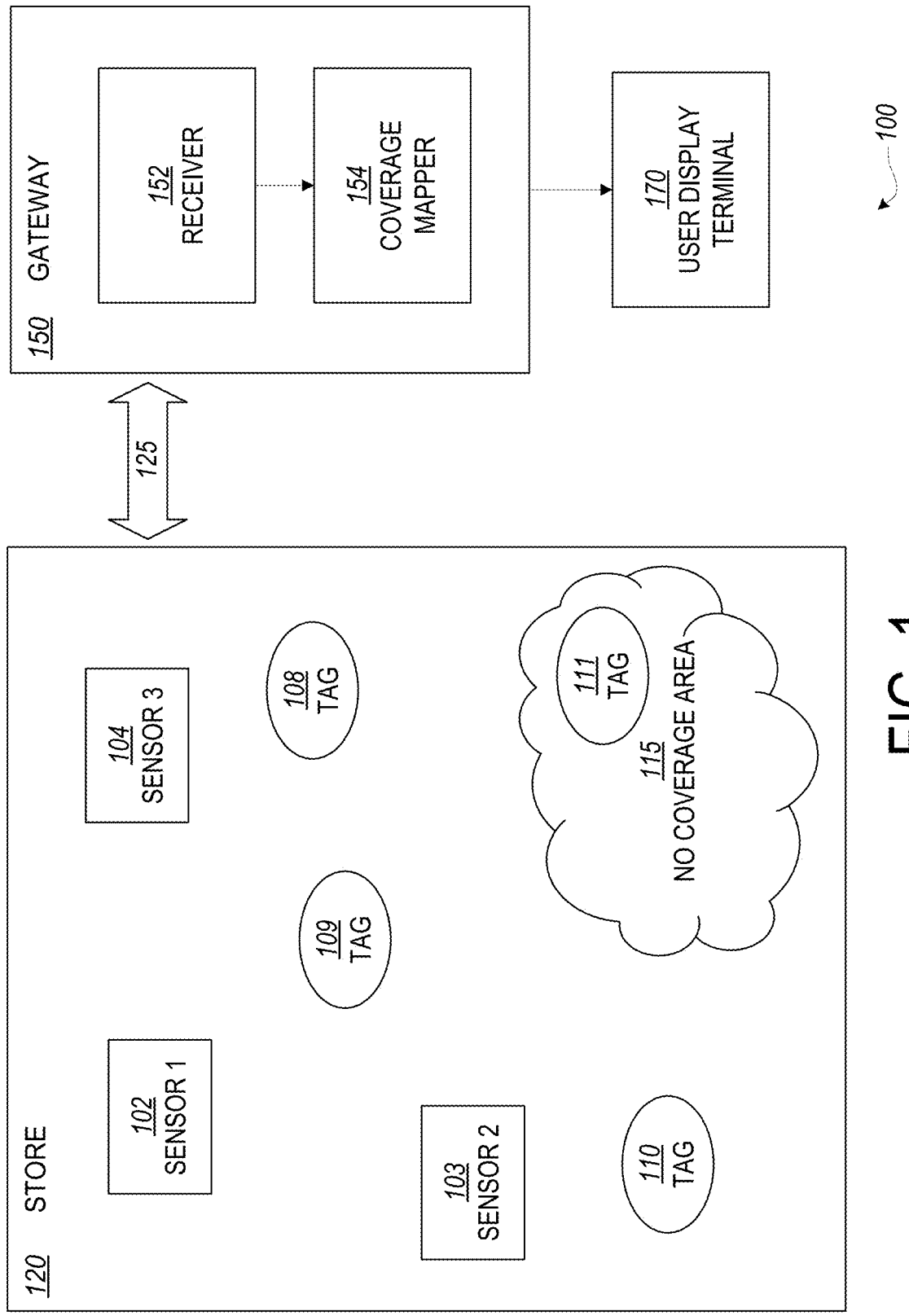
FIG. 1 is a block diagram of a system for autonomous calibration of RFID sensors in a brick and mortar store, according to various embodiments.

In addition to tracking inventory of products, brick and mortar stores would also like to be able to quickly locate the available inventories in their facilities. The present disclosure provides efficient and effective methods and apparatuses for autonomous sensor placement discovery.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For an RFID-based tracking system to be effective in tracking all tagged items in a given brick and mortar store, proper placement of the various sensors responsible for scanning the RFID tags is very helpful. Typically, RFID tags work by responding to radio frequency (RF) scans emitted by one or more sensors. An RFID tag, when scanned, responds with a localized RF response that includes the tag's unique identifier. This RF response is picked up by a receiver; in many implementations, the receiver is part of the sensor initiating the scan. Because the RF response is localized, a sensor is generally in relative proximity to the RFID tag to detect the RF response. Typical ranges may be as small as a few meters, and so, for most brick and mortar stores, multiple sensors are required to obtain coverage across the entire store or facility foot print.

Deployment of multiple sensors poses challenges. Obstacles in a typical brick and mortar store, such as store fixtures, shelves, cabinets, walls, columns, building support structures, and even the inventory to be tracked itself may attenuate or totally block either the scanning signal from the sensor, or the RF response from an RFID tag; in either scenario, no sensor is able to detect the RFID tag. Consequently, to ensure the RFID system is effective to monitor and track all items, when deciding where to place sensors within a brick and mortar store, it would be advantageous to consider such obstructions to ensure that no dead zones, where RFID tags cannot be automatically read, are created.

Proper spacing of sensors is also potentially advantageous. As each sensor emits a scanning signal to trigger any RFID tags within range to respond, and the scanning signals may use the same frequency, dead zones may be created where two sensors are located sufficiently close to cause the RF waves from one sensor to interfere with the RF waves of the other. As with obstacle-created dead zones, dead zones created due to destructive interference of RF waves likewise result in any RFID tags located within the zones becoming unreadable and, hence, unable to be tracked. Such dead zones are likely to appear in areas where RF transmissions from adjacent sensors overlap in range.

The disclosed embodiments address these and other issues by providing a system that can autonomously calibrate itself to include determination of the location of dead zones caused by obstacles relative to the placement of sensors, as well as minimize or reduce dead zones created by RF signal interference from two different sensors. Also, a tag designed to emit a signal that enables a sensor to determine the precise location of the tag relative to the sensor is disclosed. By deploying such tags across the space of a brick and mortar store, the position of each tag within the space relative to known sensor positions can be mapped. Moving around tags, sensors, and/or intentionally placing tags at known, predetermined locations can reveal dead zones; conversely, the tags can confirm proper coverage for all necessary areas. Dead zones created by RF interference can be reduced or eliminated by manipulating the phase of a given sensor's RF signal. Similarly, by adjusting a sensor's RF power in conjunction with the RF power of adjacent sensors, dead zones may be reduced or eliminated by calibrating the RF power of each sensor to prevent overlapping coverage and, hence, areas of possible RF interference.

FIG. 1 depicts an example layout of a system 100 for autonomously calibrating an RFID detection system, according to various embodiments. In the depicted embodiments, a plurality of sensors 102, 103, and 104 are disposed within a brick and mortar store 120. Three sensors 102, 103, and 104 are depicted for an example, although one to any arbitrary number of sensors may be deployed with system 100, depending upon the needs of a given implementation. Similarly, a plurality of locating tags 108, 109, 110, and 111 are disposed at various locations within the brick and mortar store 120. As with sensors 102, 103, and 104, any arbitrary number of locating tags may be deployed depending upon the needs of a given implementation.

Each of the sensors 102, 103, and 104 are configured to emit RF signals to scan for each of the plurality of locating tags 108, 109, 110, and 111, and may be similarly configured to receive RF signals broadcast by each of the locating tags 108, 109, 110, and 111 in response to the scanning RF signal. As depicted, the position of sensors 102, 103, and 104 results in an area of no coverage 115, within which locating tag 111 is positioned. Consequently, locating tag 111 may not receive the scanning RF signal from any of sensors 102, 103, and 104, and so will not respond with an RF signal of its own. If the position of locating tag 111 is known by a user of system 100, or if locating tag 111 is moved about the brick and mortar store 120 to various locations, the presence and/or shape of the no coverage area 115 may be ascertained.

Area of no coverage 115 may result from the presence of obstacles between sensors 102, 104, and/or 104 and the area 115, from no sensor being located sufficiently close to the area 115, or from one or more sensors being located too close, resulting in destructive interference either from multipath reflections (e.g. RF signal reflection off of proximate obstacles) or from competing signals from two or more sensors. Although only a single area of no coverage 115 is depicted, multiple no coverage areas 115 may be present of varying shapes and sizes, depending upon the specifics of a given implementation of system 100.

Brick and mortar store 120 can be any building, structure, store, warehouse, or other confined space, according to various embodiments. Although the phrase "brick and mortar" is employed, it should be understood that brick and mortar store 120 can be constructed from any suitable building materials, using any suitable construction techniques, now known or later developed. In other embodiments, brick and mortar store 120 may be a geographic area, which need not be enclosed. For example, brick and mortar store 120 may include a part or all of the area of an open-air market, with the area to be covered by system 100 defined by geographic boundaries such as fences, streets, vegetation, other buildings, etc. In another example, brick and mortar store 120 may include only a portion of an actual store or space, such as a show room, retail space, or warehouse. The particular portion of the store may be limited to only those areas that include items to be tracked with RFID tags, and may omit areas such as office space where tracking of items is not necessary.

Each of sensors 102, 103, and 104 is, in various embodiments, in two-way communication via a communication link 125 with a gateway 150. Communication link 125 may be implemented as a wired or wireless link, using any suitable network technology now known or later developed. Examples of possible network technologies include Ethernet, WiFi, Bluetooth, or similar networking protocols. Communication link 125 may include one or more routers, repeaters, access points, or other devices necessary to facilitate the operation of communication link 125. Further, although FIG. 1 only depicts a single communication link 125, it should be understood that each sensor 102, 103, and 104 may have its own communication link 125, with each communication link 125 possibly utilizing a different network technology from one or more of the other communication links 125. Gateway 150, although depicted outside of brick and mortar store 120, may be located at any suitable location within or outside of brick and mortar store 120, subject to environmental requirements for a given implementation of gateway 150 and/or communication link 125. In some embodiments, gateway 150 may be implemented as an edge or fog networking device, or at a remote site, such as via a cloud service or server, in a remote data center, with communication link 125 at least partially including a private or public wide-area network, such as the Internet, to allow distance communication with gateway 150.

As depicted in FIG. 1, the gateway 150 includes a receiver 152 to receive signals from the plurality of locating tags 108, 109, 110, and 111 when scanned by at least one of a plurality of sensors, the signals transmitted to gateway 150 over communication link 125. The signals indicate detection of each of the plurality of locating tags. In embodiments, receiver 152 receives the signals via sensors 102, 103, and 104, which each may be equipped to receive the signals. In some embodiments, receiver 152 receives the signals via a network module that handles communications over communication link 125, and so is configured according to the communications protocol employed for communications link 125 (e.g. Ethernet for hard-wired, such as twisted pair, WiFi for wireless, etc.). In other embodiments, receiver 152 may include the appropriate network module for directly receiving signals over communication link 125.

Gateway 150 may coordinate the operations of system 100, including causing one or more of sensors 102, 103, and/or 104 to initiate a scan for locating tags. Gateway 150 may further control sensors 102, 103, and/or 104 to adjust the signal strength of each sensor's RF transmission scan, and, as will be described in more detail herein, may adjust the phase of each sensor's RF transmission. Such control may be part of system 100's autonomous calibration of the RFID scanners to reduce or eliminate no coverage areas 115, and also to enhance the speed at which sensors 102, 103, and 104 can scan and acquire RFID tags within brick and mortar store 120. Such control may be executed automatically by gateway 150 as part of its normal functioning. Within gateway 150, either receiver 152, coverage mapper 154, or the two components working in cooperation may determine appropriate controls for sensors 102, 103, and 104. Gateway 150 may provide an interface by which a user of system 100 can adjust system parameters, e.g. scan frequency, manually adding or removing components such as additional sensors and/or locating tags, inputting the locations of sensors and/or locating tags, inputting the configuration of brick and mortar store 120, and any other functionality that may be user-configurable. Such an interface may be presented on a user display terminal 170.

Receiver 152, in some embodiments, receives signals that include the location of each of locating tag 108, 109, 110, and/or 111 relative to the receiving sensor 102, 103, or 104, which it then passes to a coverage mapper 154. These signals may also include each locating tag's unique ID, to allow for positive identification and location of each detected locating tag 108, 109, 110, and/or 111 (subject to each tag being within a detectable range of a sensor). Sensors 102, 103, and/or 104, in such embodiments, may determine the location of each locating tag 108, 109, 110, or 111 relative to the receiving sensor from the raw signal received from each locating tag. Receiver 152 may then, in some embodiments, use the relative locations to determine the absolute location of the locating tags 108, 109, 110, and/or 111, and sensors 102, 103, and 104 within brick and mortar store 120, which can subsequently be passed to coverage mapper 154. The determination of the absolute position of each locating tag 108, 109, 110, and 111 can be made where the absolute location of each sensor 102, 103, and 104 is known, in some embodiments. Other embodiments may calculate the relative location of each sensor 102, 103, and 104 with respect to each other, which then allows the position of each locating tag 108, 109, 110, and 111, to be calculated, and ultimately the entire layout of sensors and locating tags relative to each other.

In other embodiments, the signals from each locating tag 108, 109, 110, and 111 are essentially passed through in raw form from sensors 102, 103, and 104 to receiver 152. Receiver 152 in turn handles computing the relative locations of each locating tag and/or sensors 102, 103, and 104, as will be described in more detail herein with respect to FIG. 2 and sensor 200. Each locating tag 108, 109, 110, and 111 may transmit a burst, from which the receiving sensor may calculate a time-of-flight to determine distance. Each sensor 102, 103, and/or 104 may further be equipped to determine the bearing to each locating tag 108, 109, 110, and 111. The combination of raw signal (which may include a unique ID for the transmitting locating tag) along with time of flight and bearing is communicated to receiver 152, which can use the raw signal, time of flight, and bearing to determine the locations of the various locating tags as well as each sensor 102, 103, and/or 104. As with embodiments where each sensor handles computing relative locations of received locating tags, the location information is then supplied to coverage mapper 154.

In still other embodiments, calculations can be split between sensors 102, 103, and/or 104, and receiver 152. Some sensors may be configured to calculate relative locations of the locating tags, while others may pass the data to receiver 152 for calculation, which then may aggregate received relative location data with relative locations computed by receiver 152. In further embodiments, coverage mapper 154, described below, may handle some or all calculations of locations. Each sensor 102, 103, and 104 may be configured to calculate the relative location of any locating tag 108, 109, 110, and/or 111 for which it receives a signal. In some circumstances, this may result in two (or more) different sensors computing the relative location of a single locating tag, with the computed locations relative to each respective receiving sensor. These relative locations may be passed to receiver 152 along with the locating tag ID. Receiver 152 may then use the locating tag ID to reconcile the two (or more) different relative locations. Still other embodiments of system 100 may use a signal from a single locating tag received by multiple sensors 102, 103, and/or 104 to triangulate the position of the locating tag.

In embodiments, each sensor 102, 103, and 104, as will be described in further detail below, includes a locating tag co-disposed with each sensor, which responds to scans from other sensors. In this way, sensors 102, 103, and 104, as they transmit scanning RF signals, may detect not only locating tags 108, 109, 110, and/or 111, but also each sensor 102, 103, and 104. Such co-disposed tags can allow an operator of system 100 to move the location of each sensor 102, 103, or 104 throughout brick and mortar store 120, with gateway 150 recalculating the layout of sensors 102, 103, and 104 as well as locating tags 108, 109, 110, and 111 by causing each sensor 102, 103, and 104 to rescan for all locating tags. By co-disposing locating tags on each sensor, the relative locations of each sensor 102, 103, and 104 from each other sensor can be determined as well as the relative locations of each locating tag 108, 109, 110, and 111 to the sensors, thus enabling the autonomous determination of the spatial layout of all sensors 102, 103, and 104 and each locating tag 108, 109, 110, and 111.

A coverage mapper 154 is coupled to the receiver 152 to autonomously determine, in various embodiments, based upon received signals from the plurality of locating tags (including locating tags co-disposed with each sensor 102, 103, and 104), the spatial layout of system 100 with respect to brick and mortar store 120. Coverage mapper 154 may be supplied with the dimensions and layout of brick and mortar store 120. As the various locating tags (both standalone and co-disposed with a sensor) are useable to determine their relative locations with respect to each other, coverage mapper 154 need only be given the location of one sensor, which can act as an anchor node, in absolute terms with respect to the layout of brick and mortar store 120. With the knowledge of the location of the anchor node, the absolute location of all other locating tags within the brick and mortar store 120 can be autonomously determined through one or more scans by sensors 102, 103, and 104.

Still further, the presence and location of areas within the brick and mortar store 120 not scanned by at least one of the plurality of sensors can be determined. In one possible embodiment, no coverage areas 115 are determined by first scanning and locating each locating tag 108, 109, 110, and 111, and then moving the various tags throughout the areas of brick and mortar store 120 where sensor coverage is desired, while sensors 102, 103, and 104 continue to scan and update the locations of each locating tag 108, 109, 110, and 111. When a locating tag is moved to an area where no sensor 102, 103, and 104 detects it, coverage mapper 154 can determine and indicate the point at which the locating tag left coverage, and superimpose this point upon the layout of brick and mortar store 120. In another embodiment, the location and unique ID of each locating tag 108, 109, 110, and 111 within the layout of brick and mortar store 120 may be provided to coverage mapper 154 prior to scanning by sensors 102, 103, and 104. Once the scan is commenced, coverage mapper 154 can determine which (if any) locating tags 108, 109, 110, and 111 are not detected, and thus determine the location and size of no coverage areas 115.

The accuracy with which coverage mapper 154 can determine the location and size of no coverage areas 115 will depend upon the number and location of locating tags in embodiments where the locations of locating tags are supplied to coverage mapper 154 prior to scanning. A greater number of tags will result in more precise determinations of no coverage areas 115, albeit requiring more initial work to provide coverage mapper 154 the initial locations of all locating tags. In embodiments where locating tags are moved about brick and mortar store 120, accuracy is impacted by how thoroughly tags are moved about the store, as well as the frequency with which system 100 causes sensors 102, 103, and 104 to scan for locating tags 108, 109, 110, and 111. Some implementations may use a combination of these techniques. An initial scan may be performed for locating tags following identifying their location to coverage mapper 154, which can then supply an initial estimate of the location of no coverage areas 115. The precise dimensions and boundaries of the no coverage areas 115 can be subsequently refined by moving one or more locating tags about the identified no coverage areas 115 while sensors 102, 103, and 104 repeatedly scan for the one or more locating tags. Coverage mapper 154 can then update the locations and boundaries of the no coverage areas 115.

In embodiments, the coverage mapper 154 displays, or causes to be displayed, upon a user display terminal 170 the location of each locating tag 108, 109, 110, and 111 relative to each sensor 102, 103, and 104 based upon the received signals. Further, by providing coverage mapper 154 with the plan or diagram of brick and mortar store 120 as well as the absolute location of at least one of sensors 102, 103, or 104, user display terminal 170 can graphically depict the diagram of brick and mortar store 120 overlaid with the locations of locating tags 108, 109, 110, and 111, as well as sensors 102, 103, and 104, the locating tags and sensors depicted in their approximate locations within the diagram of brick and mortar store 120. In other embodiments, user display terminal 170 may instead be provided the diagram of brick and mortar store 120 as well as the location of at least one of sensors 102, 103, or 104, and construct the depiction of brick and mortar store 120 with the locations of locating tags and sensors. In such embodiments, coverage mapper 154 would only need to supply user display terminal 170 with the relative location of the various location tags and sensors, with user display terminal 170 responsible for superimposing the locations over the diagram of brick and mortar store 120. Further, as will be discussed below, in some embodiments coverage mapper 154 may incorporate information from isometric views provided by cameras co-disposed with one or more sensors 102, 103, and/or 104, such as persons and objects within brick and mortar store 120, and display the same on user display terminal 170.

As suggested above, user display terminal 170 may offer an interface for adjusting various system parameters of system 100 via gateway 150. User display terminal 170 may connect to gateway 150 via any suitable communications link. In some embodiments, user display terminal 170 may be integrated with or disposed proximate to gateway 150. In other embodiments, user display terminal 170 may connect to gateway 150 via a network. Some implementations may connect user display terminal 170 via a local area network, while other implementations may connect user display terminal 170 via an Internet or other wide area network connection, such as those that implement gateway 150 remotely as in a data center or cloud service, or provide a web browser accessible interface. User display terminal 170 may be implemented as a dedicated terminal or system that is specifically configured to interface with gateway 500, as a dedicated app running on a smartphone, tablet, or similar mobile device, or, where gateway 150 offers a web interface, as a web browser running on any suitable computing device.

Figure 2:
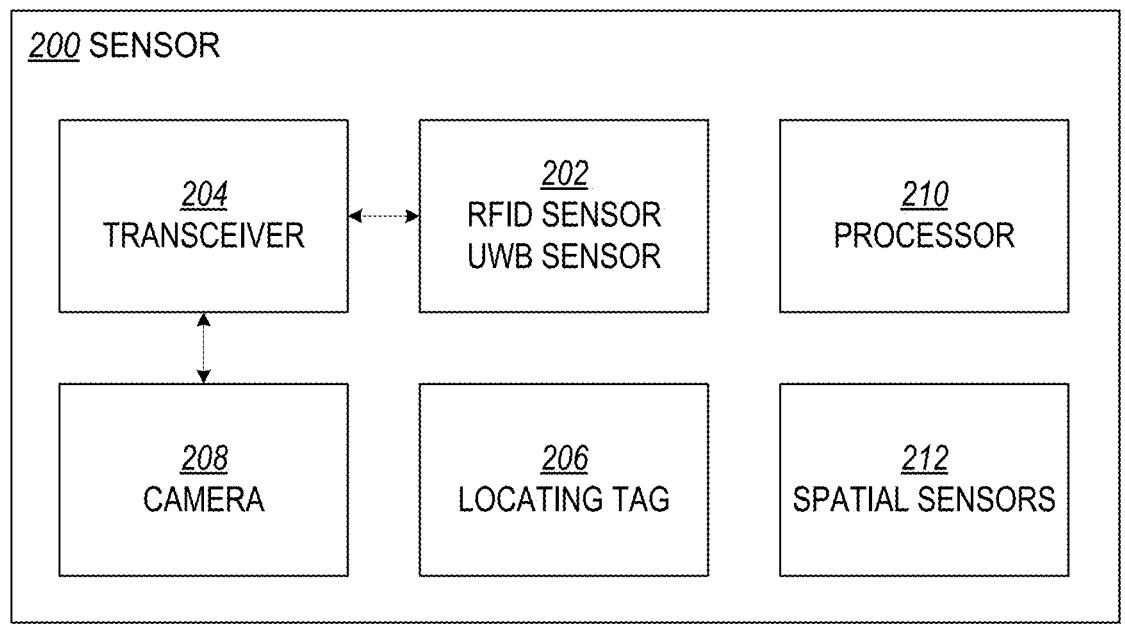
FIG. 2 is a block diagram of the components of a sensor for scanning RFID tags and locating tags that may be deployed with the system depicted in FIG. 1, according to various embodiments.
Figure 3:
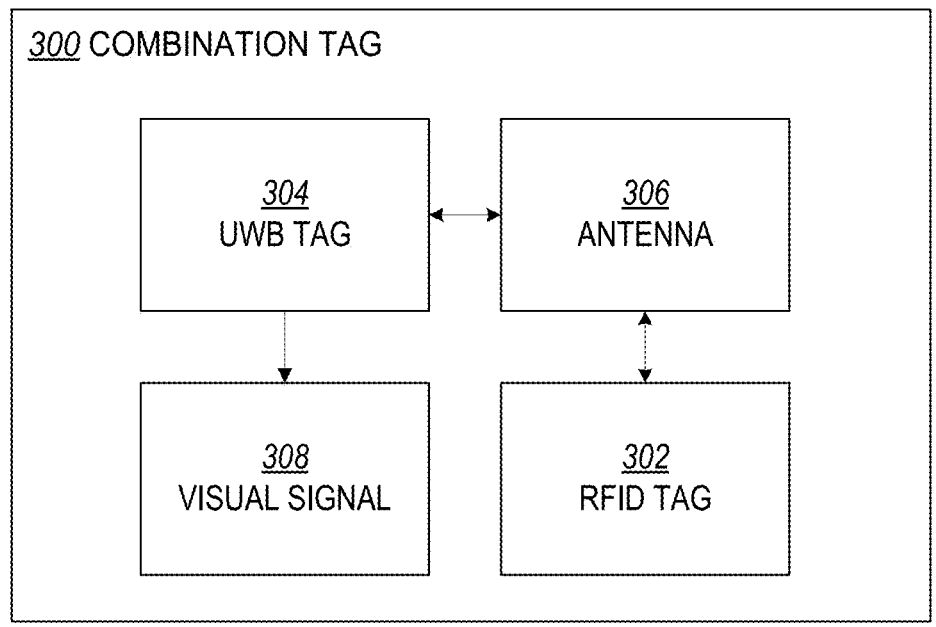
FIG. 3 is a block diagram of the components of a locating tag that may be deployed with the system depicted in FIG. 1, according to various embodiments.

Referring to FIGS. 2 and 3, block diagrams for possible embodiments of a sensor 200, which may be used to implement sensors 102, 103, and 104 of system 100, and a combination tag 300, which may be used to implement locating tags 108, 109, 110, and 111, are depicted. Sensor 200 may scan for combination tag 300 via RF signals, and may receive RF signals transmitted from combination tag 300 in response.

In FIG. 3, according to some embodiments, combination tag 300 includes an RFID tag 302, an ultra-wide bandwidth (UWB) tag 304, an antenna 306 in communication with RFID tag 302 and UWB tag 304, and a visual signal 308. RFID tag 302 may be implemented as a passive mode or active mode tag, and using any suitable RFID tag technology now known or later developed. Passive mode tags are typically unpowered, and only respond with an RF transmission when energized by an RF signal from a sensor performing a scan. In contrast, an active mode tag includes a battery or other source of power, which enables it to have greater range and to be detected at a greater distance than a passive mode tag. As is known in the field of RFID tags, each tag may include a unique ID number, which is transmitted in response to being scanned. The choice of a passive or active mode RFID tag may depend upon the requirements of a given implementation of system 100, including factors such as the size of brick and mortar store 120, obstacles in spacing and type of sensors 102, 103, and 104, In embodiments, UWB tag 304 transmits an ultra-wideband radio signal, typically in a short burst or pulse form, in response to receiving a scan from a sensor 200. Ultra-wideband communications are employed in embodiments of combination tag 300, as UWB transmissions, as is known, are capable of providing or enabling determination of a precise location of the transmitter of the UWB signal to within a few centimeters accuracy. Techniques for determining such a precise location, as may be known in the art, include time-of-flight for determining range, and using multiple antennas on the sensor receiving the UWB signal for determining bearing or azimuth from the sensor to UWB tag 304. Other techniques as known in the art may be employed. As with the RFID tag 302, UWB tag 304 may act in active or passive mode, and may include a unique ID number, distinct or the same as the ID number associated with the RFID tag 302.

In other embodiments, UWB tag 304 may be implemented using a different range-finding technology, other than ultra-wideband. Other possible implementations may include ultrasonic technology, where UWB tag 304 is configured to emit ultrasonic pulses or otherwise respond to such pulses or other signals from sensor 200, which can be used to determine range and bearing from sensor 200 to combination tag 300. Still other embodiments may rely upon other types of RF-based technology, visual signals, or a combination of any of the foregoing. UWB tag 304 may be implemented with any suitable technology that supports determining bearing and distance from sensor 200, so that the relative location of combination tag 300 may be determined with respect to sensor 200. Further still, combination tag 300 may forego UWB tag 304 in favor of self-locating technology, such as a GPS or similar receiver that enables combination tag 300 to autonomously determine its absolute location, which is then transmitted to sensor 200 upon a scan or query. Sensor 200 may then either pass the location received from combination tag 300 on to gateway 150, or may compute the relative location of combination tag 300 to sensor 200, particularly where sensor 200 likewise can determine its absolute location. The choice of implementation for UWB tag 304 will depend upon the particular implementation of a sensor 200 and/or gateway 150.

Combination tag 300 may include an antenna 306, which may be in communication with RFID tag 302 and/or UWB tag 304. Antenna 306 may be designed to improve the reception of scan RF transmissions as well as the response transmissions from RFID tag 302 and/or UWB tag 304. Although FIG. 3 depicts a single antenna 306 connected to both RFID tag 302 and UWB tag 304, in other embodiments, each of RFID tag 302 and UWB tag 304 may contain their own antennas. Such an implementation may be preferred where RFID tag 302 responds to/with a different frequency and bandwidth than UWB tag 304. In still other implementations, RFID tag 302 and UWB tag 304 may respond to different frequency scans, e.g. a sensor 200 could scan only for RFID tag 302 by transmitting an RF signal on a first frequency, and could scan only for UWB tag 304 by transmitting an RF signal on a second frequency. Moreover, RFID tag 302 and UWB tag 304 may respond to different signal configurations. A person skilled in the relevant art will understand that the configuration of antenna 306 may depend upon the particular implementation of RFID tag 302 and/or UWB tag 304, including the radio frequencies to be emitted by either tag.

A visual signal 308 may further be coupled to UWB tag 304, to display a visual signal upon UWB tag 304 being scanned. Such a visual signal may include lighting up an LED or other lamp, to indicate that combination tag 300 has received a scan. In particular, visual signal 308 may be detectable by a camera co-located with sensor 200, to provide, in various embodiments, a method for sensor 200 to calibrate a 2-dimensional isometric perspective of the co-located camera into the 3-dimensional space within brick and mortar store 120 so that, after calibration, people and objects recorded by the camera can be accurately placed on a virtual overhead map of the brick and mortar store 120, displayable on user display terminal 170. Gateway 150 may coordinate the perspectives from cameras co-located with each sensor, along with visual signals 308 from multiple combination tags 300, in providing more complete coverage of people and objects across the brick and mortar store 120. The visual signal 308 may also be usable as an alternative means to determine the location of combination tag 300. Other possible implementations of visual signal 308 include a lamp, a flag, a color change, or another suitable signal that can be readily detected by a camera on sensor 200. The choice of visual signal for a given implementation may depend upon the type of camera equipped to sensor 200 to be used with combination tag 300. Visual signal 308 may be configured to visually convey information such as a unique ID code assigned to combination tag. For example, where visual signal 308 is a lamp such as an LED, the LED may be strobed or pulsed in a predetermined pattern that can be decoded to obtain the unique ID code.

As suggested above, visual signal 308 may, in some embodiments, be used to determine range and bearing to sensor 200 in lieu of UWB tag 304, such as where sensor 200 is configured to trigger visual signal 308. Techniques such as time of flight, by way of example, where the time between sensor 200 sending a trigger pulse to combination tag 300 and when visual signal 308 responds, may be employed to provide distance measurement, with the position and angle of a camera associated with sensor 200 possibly providing bearing information. Other implementations may utilize a visual signal 308 with a particular shape and size that is predetermined and known by sensor 200 or gateway 150, which can then be used in conjunction with a camera on sensor 200 to determine range by measuring the relative size and shape of the signal within a frame captured by the camera.

Sensor 200, which may be used to implement sensors 102, 103, and/or 104, is depicted in FIG. 2, as an apparatus for autonomous sensor placement discovery in brick and mortar store 120. In various embodiments, sensor 200 comprises an RFID/UWB sensor 202 configured to detect both RFID tags and UWB tags, such as those present on combination tag 300. RFID/UWB sensor 202 scans for one or more locating tags, such as a combination tag 300, within a range external to sensor 200. Sensor 202 receives response signals from one or more tags external to sensor 200 that are within the range of the scan of RFID/UWB sensor 202. These received signals may be provided to a transceiver 204 coupled to sensor 200, in various embodiments.

Transceiver 204 may be integrated with the sensor 200 in some embodiments, or disposed at the brick and mortar store 120 in other embodiments. Where integrated, transceiver 204 may be a separate module contained within the same housing as sensor 200, or may be integrated into the circuitry of sensor 200, such as on a common or coupled printed circuit board, or as part of a System on a Chip (SoC) implementation, as may be found in various IoT devices that integrate a CPU and communications module. Transceiver 204, in some embodiments, may be discrete but disposed proximate to sensor 200, e.g. mounted on or adjacent to sensor 200. Transceiver 204 may be coupled to sensor 200, regardless of its position, by either a wired or wireless communication link, such as via direct wired connection, via a network technology such as Ethernet, using fiber optics, coaxial cable (e.g. via DOCSIS), or other hardline, or via a wireless link such as WiFi, Bluetooth, NFC, Zigbee, or any other suitable wired or wireless communications technology now known or later developed. Transceiver 204, in turn, provides the received signals to communicate detection(s) of the one or more tags to gateway 150 or a similar edge device.

Sensor 200 may include a locating tag 206, such as a UWB tag similar to UWB tag 304 described above with respect to combination tag 300, co-disposed with the sensor 200. The locating tag 206 is to transmit a signal for detection by another sensor, where the detection of the signal of the co-disposed locating tag 206 by the other sensor is also communicated to the gateway 150 or edge device. The communicated detections are used by the gateway 150 to determine autonomously sensor placements in the brick and mortar store 120.

In embodiments, RFID/UWB sensor 202 is a combination device configured to scan for, via an RF signal, either RFID tags or UWB tags, such as RFID tag 302 and UWB tag 304 of combination tag 300 described above. In some implementations, system 100 may include stand-alone RFID tags, which may be attached to merchandise, fixtures, shelves, etc., that are to be tracked, as well as locating tags, implemented in some embodiments as stand-alone UWB tags; in such implementations, RFID/UWB sensor 202 may be configured to scan for and receive signals from both types of stand-alone tags. RFID/UWB sensor 202 may act as a transceiver, transmitting by the scanning RF signal as well as receiving the RF transmissions from the RFID and/or UWB tags in response to the scans. In other embodiments, RFID/UWB sensor 202 may be implemented as two discrete sensors, one configured to scan for RFID sensors, and the other configured to scan for UWB sensors, each discrete sensor also receiving RF transmissions from their corresponding scanned tags. In still further embodiments, the signals from the RFID and/or UWB transmissions may be received by a separate receiving circuit, which may be configured to receive RFID transmissions, UWB transmissions, or both.

In embodiments, RFID/UWB sensor 202 is to determine the bearing and distance to a combination tag 300 or other locating tag, thereby enabling the relative position of the tag to sensor 200 to be determined. Where the tag employs ultra-wideband, techniques such as time of flight, as discussed above, may be used to determine the range to the tag. Sensor 202 may determine the bearing of the combination tag 300 or locating tag by techniques such as diversity reception or beamforming, where RFID/UWB sensor 202 is configured with a plurality of antennae. The bearing may be expressed as an angle relative to a predetermined orientation axis of sensor 200, e.g. the "front" of sensor 200. In other embodiments, each sensor 200 of a system 100 may be calibrated to express bearing with respect to an external reference, such as magnetic or true north, or a particular direction or orientation of brick and mortar store 120. In some embodiments of sensor 200, sensor 200 may include a magnetic compass, such as part of spatial sensors 212 (to be discussed further herein), which can provide the bearing reference.

The particular implementation of RFID/UWB sensor 202 will depend upon the type of tags the sensor is designed to scan. In embodiments for scanning a combination tag 300 that uses locating technology other than UWB, as described above, RFID/UWB sensor 202 is configured to scan for and detect the locating technology employed by combination tag 300. With reference to the examples provided above in the description of combination tag 300, in one example RFID/UWB sensor 202 may be configured to emit an ultrasonic pulse and/or receive an ultrasonic pulse where combination tag 300 uses ultrasonic technology to determine relative position.

In various embodiments, RFID/UWB sensor 202 is coupled to or otherwise in communication with a transceiver 204. Transceiver 204 is configured to handle communications with gateway 150 of system 100. As such, transceiver 204 is implemented with technology that is appropriate to the specific implementation of gateway 150, more specifically receiver 152. In some embodiments, transceiver 204 may include a network interface, such as Ethernet, WiFi, Bluetooth, or similar technology suitable for transmitting the signals received from scanned tags. In other embodiments, transceiver 204 may include functionality for receiving signals from combination tag 300. In such embodiments, RFID/UWB sensor 202 may only be configured to scan for RFID and UWB tags, with receiving functionality implemented in transceiver 204. In still other embodiments, RFID/UWB sensor 202 may initiate scans for RFID tags, UWB tags, and/or combination tags 300 by causing transceiver 204 to emit the scanning RF signal, with transceiver 204 also receiving the responses from the tags.

Sensor 200 may be equipped with a camera 208 in some embodiments, which is either co-disposed with sensor 200 or otherwise coupled with sensor 200, and may be in communication with transceiver 204. Camera 208 may be configured to detect a visual signal 308 from a combination tag 300 or a stand-alone locating tag that includes a visual signal. In some embodiments, camera 208 may be a conventional video camera, such as may be used in a digital still or video camera. In other embodiments, camera 208 may detect beyond-visible light, such as infrared or ultraviolet. In still other embodiments, camera 208 may comprise multiple sensors, each configured to detect different wavelengths. Camera 208 may be configured in a stereo configuration with two sensors spaced apart to allow sensor 200 to perform stereoscopic range finding with visual signal 308 of a combination tag 300. In other embodiments, sensor 200 may employ object recognition with a known shape and size of visual signal 308 to calculate the range to combination tag 300, based upon the resolution and frame size of camera 208. The particular implementation of camera 208 for a given sensor 200 will depend upon the types of visual signals 308 that are implemented by a combination tag 300 to be used with system 100.

Bearing to visual signal 308 may calculated by determining the position of visual signal 308 within the frame of camera 208, along with knowledge of the angular field of view of camera 208. By employing multiple cameras facing in different directions, in some embodiments, a visual signal 308 may be tracked, and its corresponding bearing determined, the full 360 degrees around sensor 200. The number of cameras 208 needed to achieve a desired amount of coverage around sensor 200 may depend upon the particular angular field of view of each camera 208, as will be understood.

Camera 208 may be employed as a secondary, backup, or redundant means for sensor 200 to detect a combination tag 300, with visual signal 308 being triggered when combination tag 300 is scanned by RFID/UWB sensor 202. For example, where a combination tag 300 is detected by sensor 200, if combination tag 300 leaves the reception range of sensor 200 but is still able to receive scanning signals, the visual signal 308 may be tracked by camera 208 in response to a scan, even though an RF response is not detected. Where visual signal 308 can encode and transmit the unique ID of combination tag 300, camera 208 may be able to positively identify combination tag 300.

As depicted in FIG. 2, camera 208 may be in communication with transceiver 204, and may use transceiver 204 to transmit visual information on visual signal 308 to gateway 150, which may use the information to determine bearing and distance of the combination tag 300 from sensor 200. The transmitted information will vary depending upon a particular implementation of camera 208.

In embodiments, sensor 200 includes a locating tag 206, which allows the position of sensor 200 to be determined relative to other sensors 200 in a given implementation of system 100. Locating tag 206 may be implemented as combination tag 300. Where the full functionality of a combination tag 300 is not necessary, sensor 200 may be equipped with a UWB tag 304 and/or visual signal 308, to provide the ability to accurately locate sensor 200 in system 100. Still other embodiments may implement locating tag 206 as a GPS or similar receiver, to provide an absolute geographic position with which to reference the locations of detected combination tags 300 and/or other locating tags.

Sensor 200 may include a processor 210 to coordinate the functionality of its various components. Processor 210 may be responsible for calculating the relative position of a detected combination tag 300 or locating tag from the received signals (RE, visual or otherwise) in implementations where sensor 200 supplies the relative position of each detected tag, as opposed to implementations where sensor 200 simply passes on the raw received signal, as discussed above. Processor 210 may perform such calculations on the basis of stored executable instructions. In other embodiments, processor 210 may at least partially comprise discrete circuitry or dedicated hardware for calculating the tag's relative position. Such calculations may result in a range and bearing angle from the reference direction discussed above, which are then supplied to gateway 150 via transceiver 204. Processor 210 may, in various embodiments, perform the time-of-flight calculations necessary to determine the range component of the relative position of a detected tag. Processor 210 may be implemented using any suitable processor technology now known or later developed. Such possible implementations are discussed herein with respect to FIG. 9.

The various components of sensor 200 as depicted in FIG. 2 are logical and functional in nature. It should be understood that at least some of the functionality of the various components as described herein may be implemented on processor 210 using software.

Sensor 200 may also include one or more spatial sensors 212. One possible spatial sensor 212 is a magnetic compass, to supply a reference point for expressing the bearing of detected combination tags 300 or locating tags. Sensor 200 may be equipped with other spatial sensors 212 to determine the orientation of sensor 200 in space in three dimensions. Examples of such spatial sensors 212 may include, in addition to a magnetic (or flux gate) compass, one or more gyroscopes, accelerometers, magnetometers, barometers, altimeters, and/or any other sensor technology useful for determining the spatial orientation of sensor 200. The sensors may be implemented using solid state technology such as MEMS. Other embodiments may use any suitable technology now known or later developed. Spatial sensors 212 may be used by sensor 200 to precisely locate detected RFID tags, as will be described in greater detail below.

Figure 4:
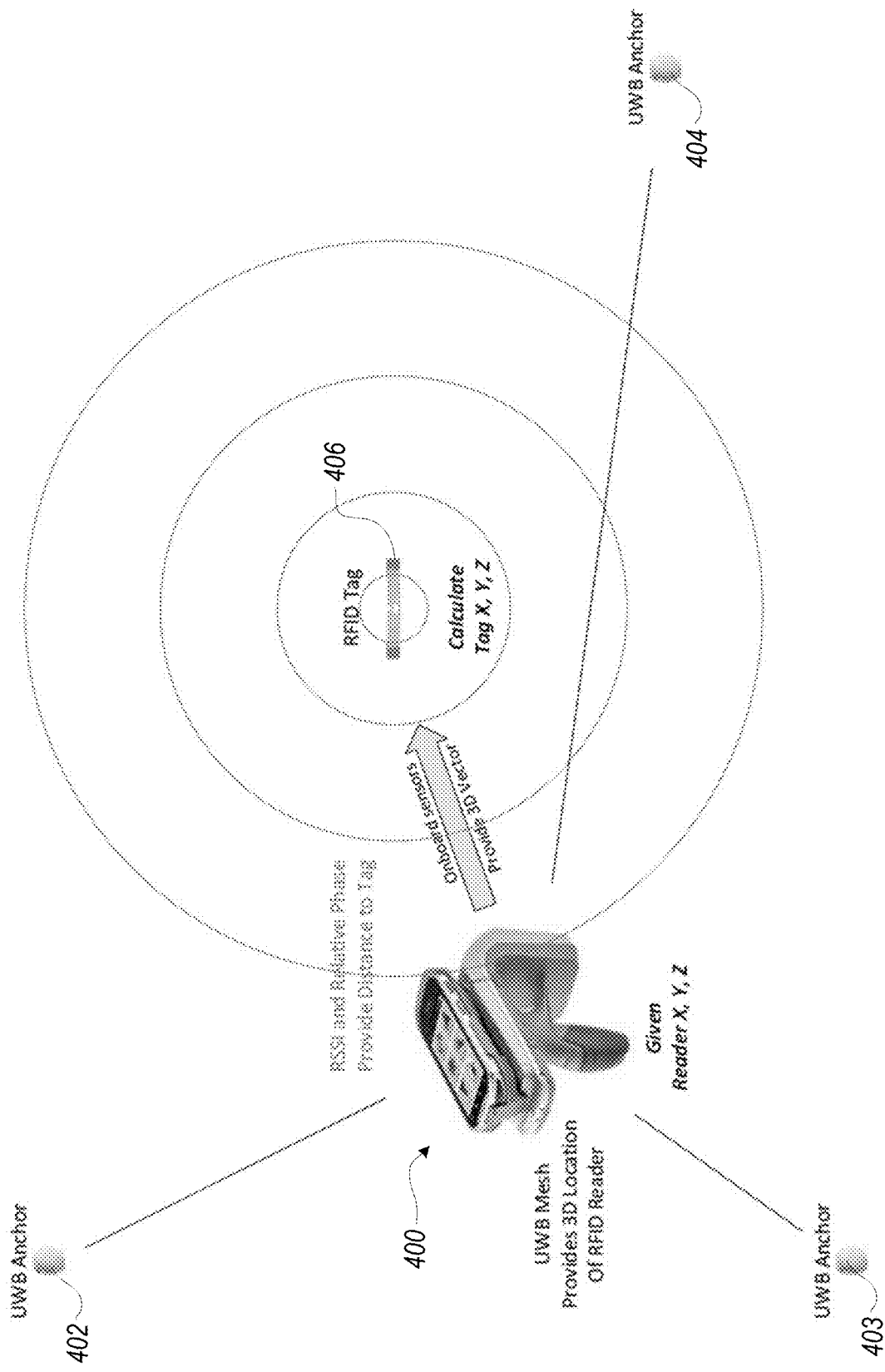
FIG. 4 depicts a mobile or hand-held sensor for scanning and locating RFID tags, useable with the system depicted in FIG. 1, according to various embodiments.

While sensor 200 will typically be deployed in a stationary or fixed position within brick and mortar store 120, in FIG. 4, a mobile embodiment of sensor 200, mobile sensor 400, is depicted. Mobile sensor 400 may be used to precisely locate RFID tags 406 (as opposed to combination tags 300 or locating tags) that may be attached to various inventory in a brick and mortar store 120, as described above. Embodiments of mobile sensor 400 include the components of sensor 200 depicted and described above. Mobile sensor 400, which includes a locating tag 206, may be detected by one or more anchor nodes 402, 403, and 404 that correspond to sensors 102, 103, and 104 in the depicted embodiment. The anchor nodes 402, 403, and 404 allow the position of mobile sensor 400 to be precisely determined, via locating tag 206 that is co-disposed with mobile sensor 400, relative to one or more of the anchor nodes. Locating mobile sensor 400 with respect to stationary anchor nodes 402, 403, and 404 enables mobile sensor 400 to precisely determine the location of RFID tags 406 it may scan and detect relative to itself.

As the location of mobile sensor 400 can be determined relative to the anchor nodes 402, 403, and/or 404, by extension, the location of detected RFID tag 406 can be determined within system 100 by its position relative to the mobile sensor 400 when detected. In one possible embodiment for determining the location of an RFID tag 406 detected by mobile sensor 400, anchor nodes 402, 403, and/or 404 fix the location of mobile sensor 400 relative to one or more of themselves at approximately the same time that mobile sensor 400 determines the location of a detected RFID tag 406. As depicted in FIG. 4, each anchor node 402, 403, and 404 may act as a mesh, utilizing UWB in the depicted embodiment, allowing mobile sensor 400 to be positioned in three-dimensional space within brick and mortar store 120. The location of mobile sensor 400 is determined at approximately the same time as RFID tag 406 to ensure that mobile sensor 400 has not significantly moved since detecting RFID tag 406, to help ensure the location of RFID tag 406 is precisely identified. These two pieces of information, the relative location of mobile sensor 400 and the relative location of the RFID tag 406 with respect to mobile sensor 400, are then provided to gateway 150, which may then determine the location of the detected RFID tag 406 within brick and mortar store 120.

RFID tags may not provide a signal that allows for precision locating on a level comparable to a UWB tag, which supports distance measurements with a precision of a centimeter or two. To compensate, in embodiments, mobile sensor 400 can utilize a combination of its orientation in space in connection with one or more of the received signal strength indication (RSSI) and relative phase of the response signal transmitted from the RFID tag 406 to calculate the distance and bearing, expressed in azimuth and elevation. With knowledge of the nature of the signal emitted by the detected RFID tag 406, the RSSI and relative phase can enable mobile sensor 400 to determine the distance to the detected RFID tag 406 relatively accurately. As will be understood, the greater the distance between the detected RFID tag 406 and the mobile sensor 400, the lower the RSSI will be. By using principles such as the inverse square law along with an estimation of the signal strength initially transmitted by RFID tag 406, an approximation of distance may be made. By also detecting the relative phase of the received signal, the distance approximation can be refined to a greater precision.

With these techniques, the position of detected RFID tag 406 can be ascertained with a relatively high degree of precision. For example, spatial sensors 212, described above in connection with sensor 200, can supply the orientation of mobile sensor 400 in up to three dimensions, e.g. heading, front to back tilt, side to side tilt, and potentially altitude. As mobile sensor 400 could be spatially positioned in any orientation when detected by anchor nodes 402, 403, and/or 404, knowing the orientation of mobile sensor 400 is necessary to accurately determine its position relative to the anchor nodes, and by extension, the precise position of a detected RFID tag 406.

These three spatial dimensions, combined with direction finding techniques described above such as beamforming and/or diversity reception using two or more antennas, may allow mobile sensor 400 to correctly identify the bearing of detected RFID tag 406 in terms of both azimuth and elevation, e.g. lateral direction as well as an angle indicating the direction vertically, e.g. above or below, mobile sensor 400. For example, an initial detection would provide the azimuth and elevation of detected RFID tag 406 relative to the position and orientation of mobile sensor 400. Information from spatial sensors 212 can inform the mobile sensor 400 of its orientation in terms of pan, tilt, and yaw relative to a level plane of brick and mortar store 120, which in turn allows the orientation of the detected RFID tag 406, expressed in the frame of reference of mobile sensor 400, to be translated to the frame of reference of anchor nodes 402, 403, and 404. This translated frame of reference, in turn, combined with the determined distance of the detected RFID tag 406 from mobile sensor 400, allows a gateway 150 to correctly locate the detected RFID tag 406 with respect to anchor nodes 402, 403, and 404, and by extension, to an absolute location within brick and mortar store 120. This is only one possible embodiment; other embodiments may employ different techniques to ascertain the bearing and distance of RFID tag 406, and by extension its location within brick and mortar store 120, without departing from the disclosed embodiments.

Referring back to FIG. 1, sensors 102, 103, and 104 are configured to scan for RFID tags in the disclosed embodiment while in operation. Where apparatus 100 is employed in a retail or warehouse setting, it is possible for thousands, or even tens of thousands, of RFID tags to be placed within the brick and mortar store 120. Even with multiple sensors 200, performing an inventory of thousands or tens of thousands of RFID tags may consume a significant amount of time, which thereby limits the frequency with which inventory may be automatically updated. This may be due at least partially to the presence of possible RF collisions by RFID tags that, when energized by a scan at approximately the same time, may transmit a response at approximately the same time. The possibility of RF collisions and interference may necessitate repeated scans or careful staggering of scans from a plurality of sensors 200; however, these techniques add to the amount of time it takes to complete a complete inventory scan.

Figure 5:
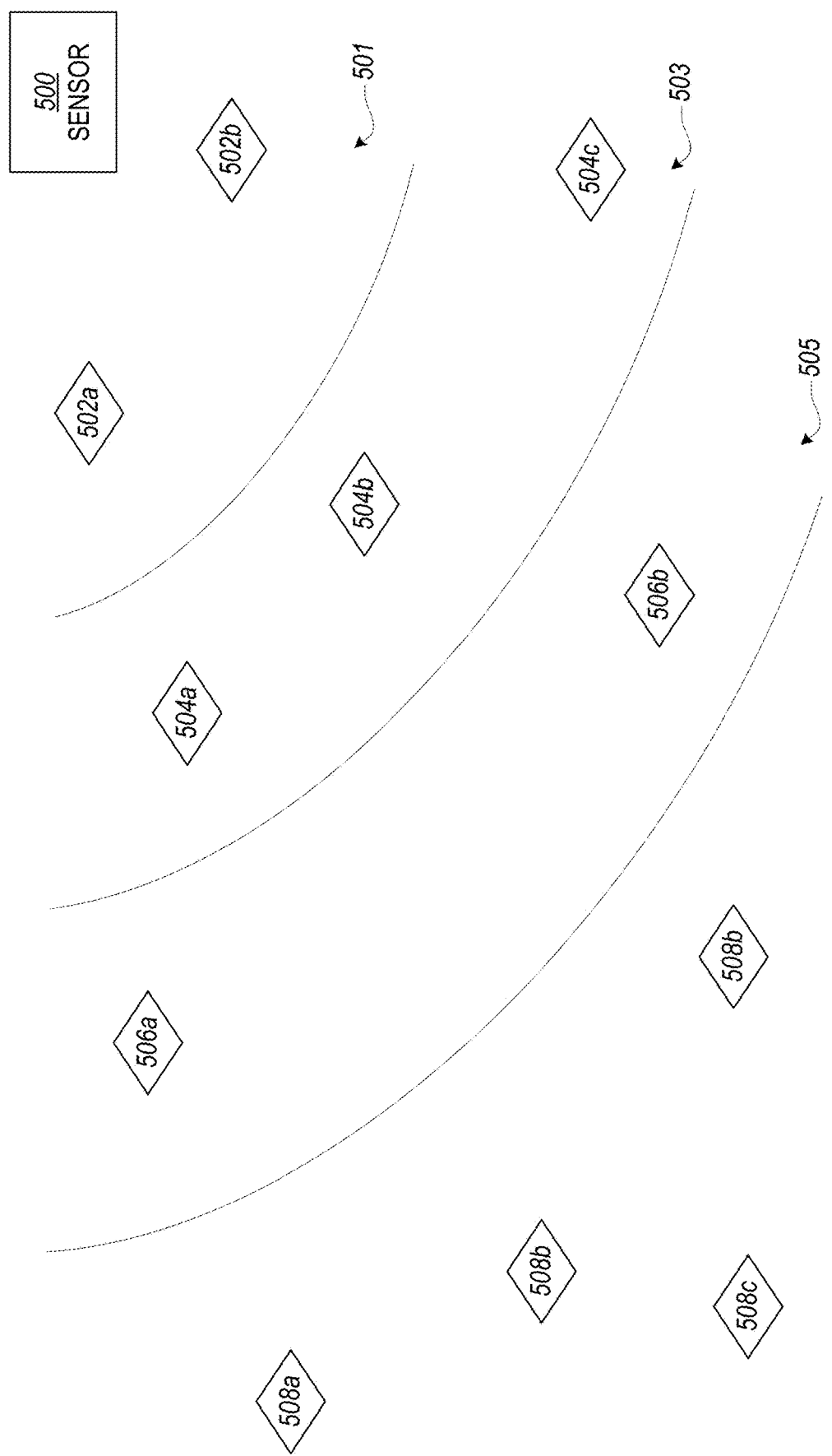
FIG. 5 depicts the use of incremental RF power from a scanner to detect a plurality of RFID tags in successively wider ranges, according to various embodiments.

FIG. 5 depicts a solution to this problem, according to some embodiments. In FIG. 5, a sensor 500, which may be an implementation of a sensor 200, is configured to scan for a plurality of RFID tags, depicted as tags 502a-b, 504a-c, 506a-b, and 508a-d. Rather than scanning for all tags in a single pass, sensor 500 may be configured to modulate the RF power of its scan signals in a step-wise fashion, thereby limiting the effective range of each scan, and so limiting the number of RFID tags that respond to each scan. By limiting the number of tags on each scan, the likelihood of an RF collision between several tags can be limited, if not altogether eliminated.

In the depicted embodiment, sensor 500 initially scans with a low power, which limits the scan range to sector 501, picking up tags 502a and 502b. Once registered, the tags may be instructed to ignore a subsequent scan, which is part of the known RFID protocols. Sensor 500 next scans with a stepwise higher power level, extending the scan range to cover sector 503. As tags 502a and 502b have been instructed to ignore the subsequent scan, only tags 504a, 504b, and 504c respond. As with 502a and 502b, tags 504a-c are likewise instructed to ignore a subsequent scan. Scan power from sensor 500 is increased stepwise again, expanding the scan range to sector 505, where tags 506a and 506b respond; tags 502a, 502b, and 504a-c ignore the scan. Tags 506a and 506b are likewise instructed to ignore a subsequent scan. Finally, sensor 500 increases its scan strength to maximum, extending the scan range to sector 507, to pick up remaining tags 508a, 508b, 508c, and 508d; all other tags ignore the scan as instructed. Sensor 500 thus completes the scan of all tags and, if necessary, resets all tags to respond to subsequent scans to ensure a response for the next series of scans. This stepwise scan pattern, by reducing or eliminating RF collisions from proximate tags, can be accomplished in less time than full-strength scans that may need to be repeated multiple times to ensure that all tags are detected.

It should be appreciated that stepwise modulation of scan power by sensor 500 can also be used by gateway 150 in connection with system 100 to help eliminate areas of overlap coverage by two sensors 102, 103, and/or 104 in brick and mortar store 120, to prevent unnecessary duplicate probing of RFID tags.

Figure 6:
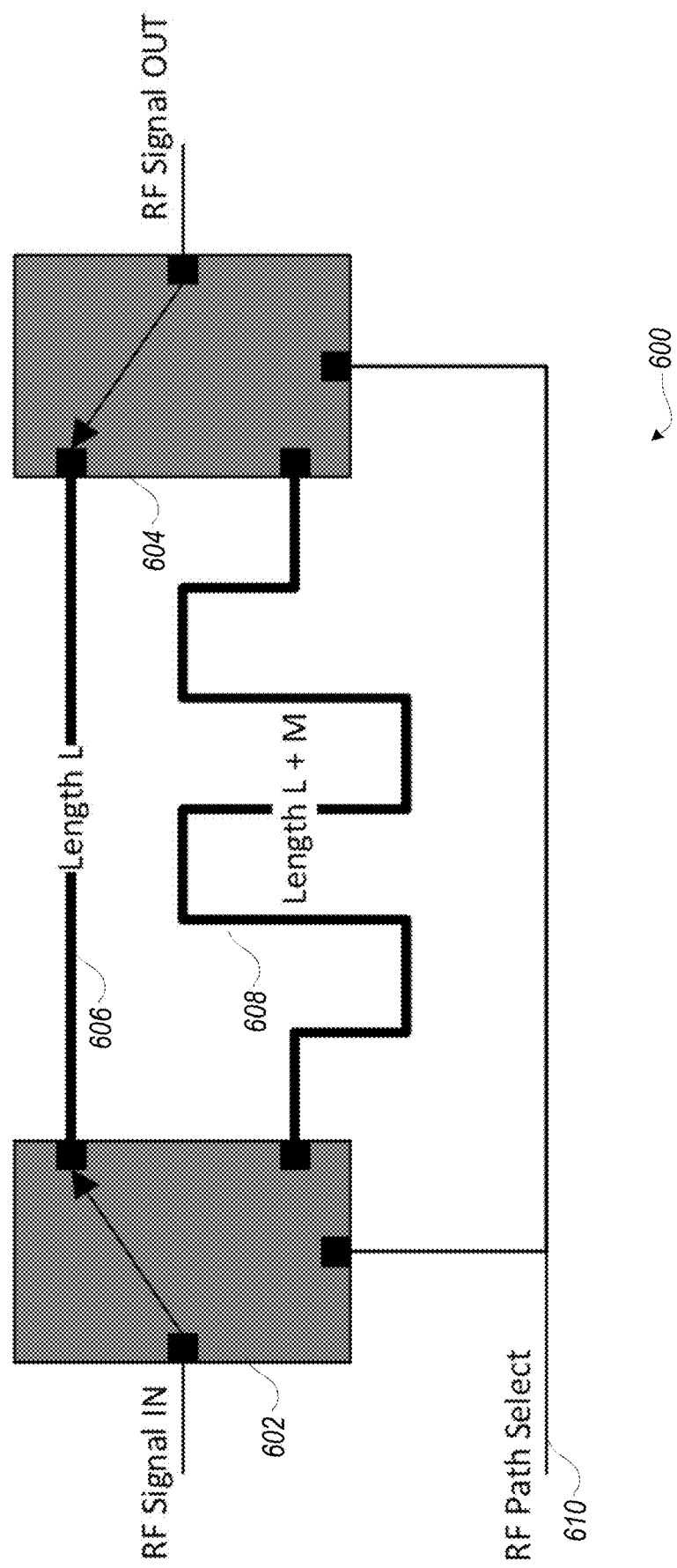
FIG. 6 depicts a selectable delay line for adjusting an RF signal phase from an RFID sensor, according to various embodiments.
Figure 7:
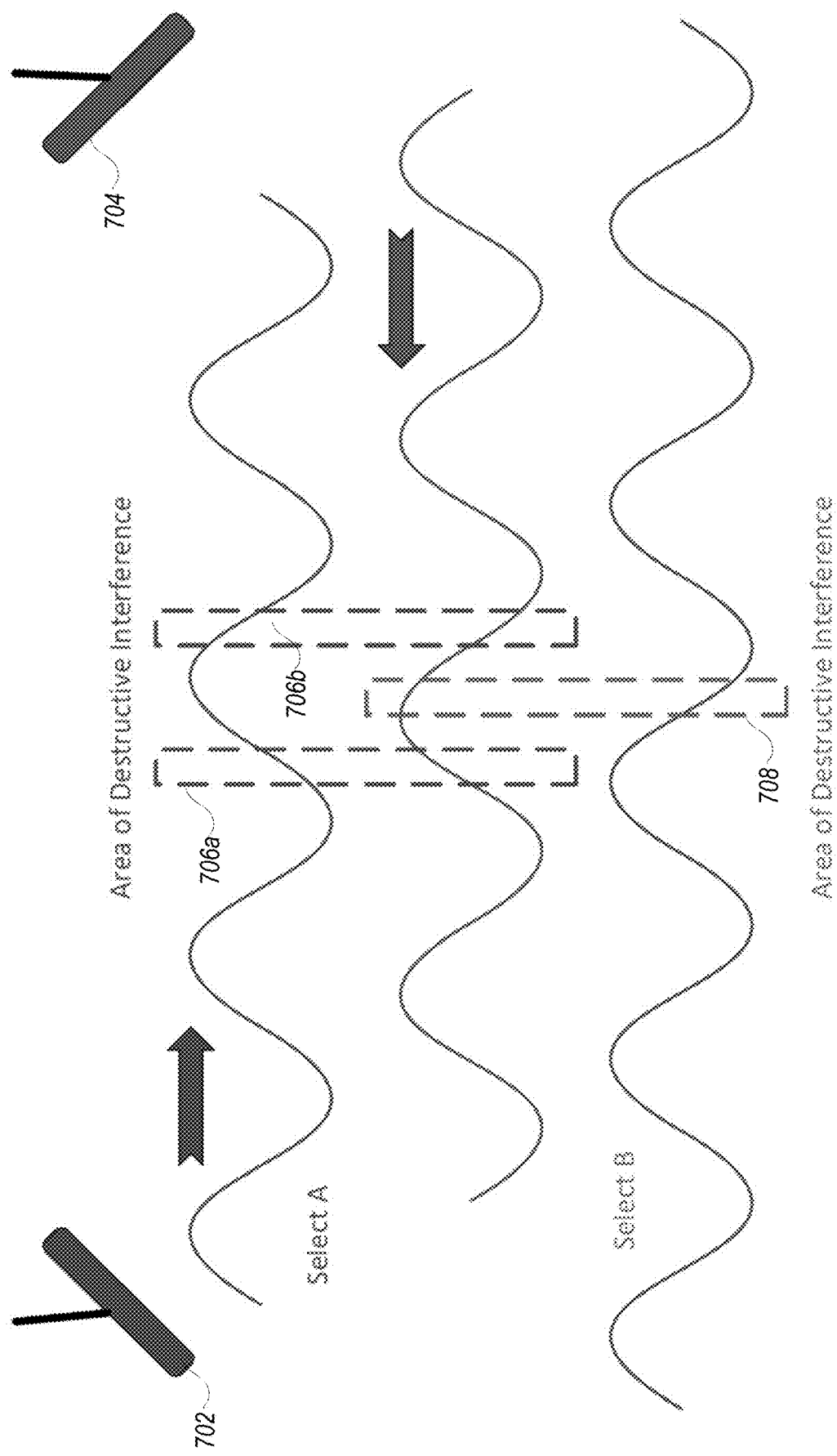
FIG. 7 depicts how areas of destructive interference may be moved or manipulated by RF signal phase adjustment, according to various embodiments.

Even with modulation of scan power, sensors 102, 103 and/or 104 may nevertheless, if placed sufficiently proximate to each other, create areas of no coverage due to destructive interference of scanning RF signals from two different sensors. Turning to FIGS. 6 and 7, a possible solution to this problem is depicted. FIG. 7 graphically illustrates the problem. FIG. 7 depicts a first sensor 702, which is relative proximate to a second sensor 704. If each of first sensor 702 and second sensor 704 emit scanning signals simultaneously, depending on the position of the respective phases of the signals from each sensor, one or more areas of destructive interference 706a, 706b may be generated. These areas of destructive interference create areas of no coverage; an RFID tag located in one of areas 706a or 706b may not register the scanning signal, and so not respond. The destructive interference, then, effectively masks the presence of any RFID tags within the areas.

These masked RFID tags may be detected by altering the phase of signal from one of first sensor 702 or second sensor 704, thereby moving the location of the area of destructive interference. For example, rotating the phase of a scanning signal from one of first sensor 702 or second sensor 704 180 degrees with respect to the other may result in creation of a single area of destructive interference 708, which is spatially in a different location than areas 706a and 706b. While the area(s) may not be completely removed, by moving them and repeating the scan, any RFID tags hidden by an area of destructive interface will be detected.

FIG. 6 illustrates a delay line 600 according to embodiments by which the phase of a sensor may be altered, to effect this moving of areas of destructive interference. Delay line 600 includes an RF input 602, an RF output 604, a first delay line 606, a second delay line 608, and an RF path selector 610. An RF signal, such as a scanning signal, is injected into RF input 602, where it follows one of first delay line 606 or second delay line 608, and exits via RF output 604, which may be connected to or incorporate an antenna for transmission.

As depicted in FIG. 6, first delay line 606 presents a shorter path than second delay line 608. Consequently, the RF signal will take a slightly longer time to transit second delay line 608 as compared to first delay line 606. RF path selector 610, as can be seen, toggles between first delay line 606 and second delay line 608 to allow selective control over which path the RF signal traverses. RF path selector 610 may be manually toggled, such as connected to a switch, or automatically switched, such as via gateway 150. The various components of delay line 600 may be selected with respect to the characteristics of the RF signal to be delayed. Further, the relative lengths of first delay line 606 and second delay line 608 may be selected to ensure that the phase of an injected RF signal differs time-wise depending upon the selected delay line. As will be understood, the lengths of first delay line 606 and second delay line 608 should be chosen to ensure a phase difference; for example, delay lines that are various integer multiples in length with respect to each other, e.g. second delay line 608 is twice the length of first delay line 606, may delay the signal, but nevertheless unacceptably result in the phases being unchanged. Conversely, a delay line that is fractionally different in length, e.g. second delay line 608 may be approximately 50% longer than first delay line 606, may result in a desirable phase shift of 180 degrees.

While delay line 600 is depicted as having two delay line paths, it should be understood that delay line 600 may have multiple selectable delay line paths that allow for a fine tuning of the phase from an equipped sensor. By rotating phases a few degrees (e.g. non-orthogonally), areas of complete destructive interference may be altogether eliminated in favor of a few areas of possibly weaker coverage that are nevertheless detectable by RFID tags.

Delay line 600 need not be placed on every sensor 200. Depending upon the spacing of sensors for a given implementation of system 100, only a select number of sensors need be equipped with delay line 600. However, in implementations where the position of sensors 102, 103, and 104, for example, may be moved, or even where fixtures that may present multi-path interference may be moved within brick and mortar store 120, it may be useful to equip all sensors with a delay line 600. The RF path selectors 610 of each sensor may be tied into gateway 150 (and by extension, user display terminal 170) to allow phases to be shifted autonomously by gateway 150 during inventory scans, as well as to help locate no-coverage areas 115 that may be generated by destructive interference.

Figure 8:
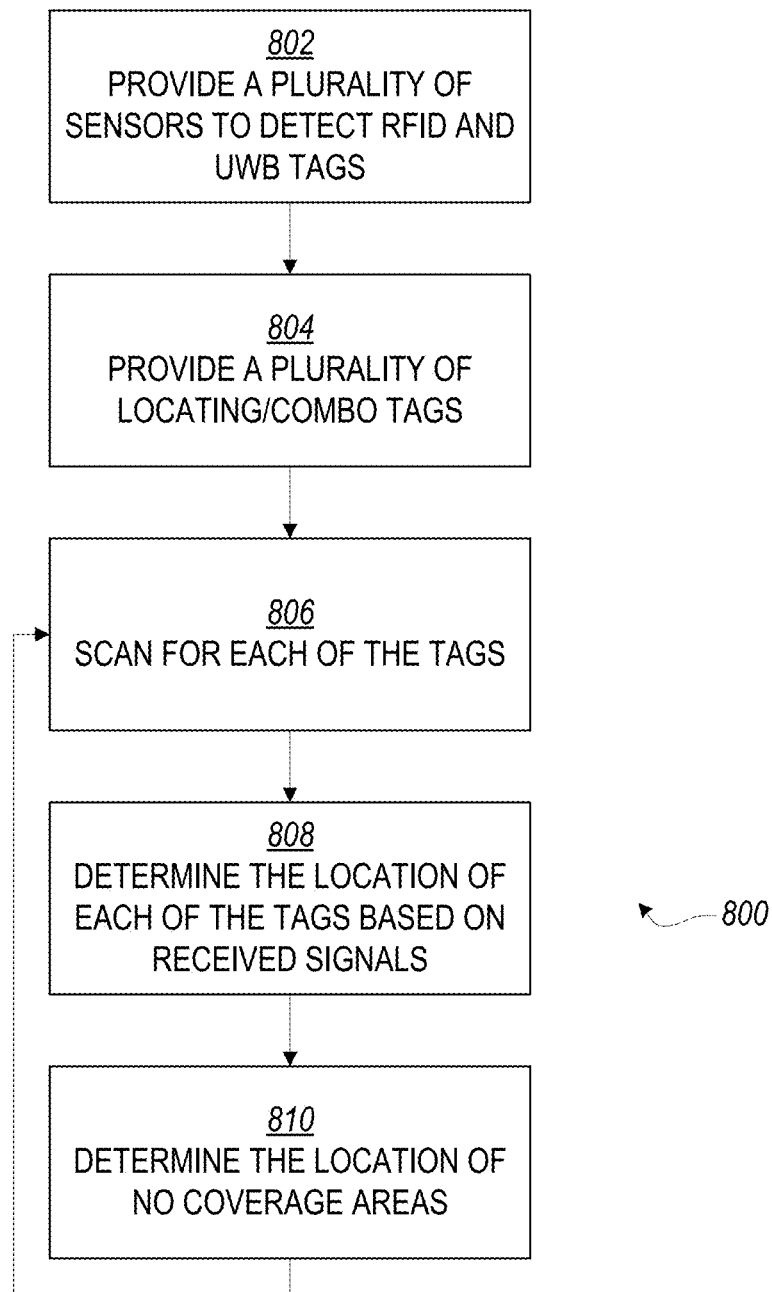
FIG. 8 is a flowchart for a method of autonomously calibrating an RFID system that may be executed by the system depicted in FIG. 1, according to various embodiments.

FIG. 8 is a flow chart of the operations of an example method 800 for autonomously calibrating an RFID system, such as system 100, according to some embodiments. The operations of method 800 may be performed in whole or in part by various components of system 100, such as sensors 102, 103, and/or 104, as well as gateway 150 and its constituent components. In operation 802, a plurality of sensors, such as sensor 200, are provided, with each of the plurality of sensors located at a fixed position within a brick and mortar store. In operation 804, a plurality of locating tags, such as combination tags 300, are provided within the brick and mortar store 120. As described above with respect to at least FIG. 3, each of the plurality of locating tags is to emit signals indicating detection of the locating tag.

In operation 806, the plurality of sensors scan for each of the plurality of locating tags. The locating tags respond to the scan, such as with a UWB burst. In operation 808, the locations of the plurality of locating tags relative to each of the plurality of sensors are determined as described above with respect to FIGS. 1-3, using signals, such as the UWB signals, received from the plurality of locating tags in response to the scanning.

Finally, in operation 810, the presence and location of areas within the brick and mortar store not scanned by at least one of the plurality of sensors is determined based on the locations of the plurality of locating tags. As described herein, the identification of these areas may be further refined and/or more precisely identified by moving the location of the various locating tags, as well as employing the use of a mobile scanner 400.

These areas that are not scanned may be presented to a user or administrator of system 100, such as via a user display terminal 170. By graphically depicting the areas of no coverage, the locations of the various sensors 200 within brick and mortar store 120 may be modified to minimize or eliminate any areas of no coverage. Still further, by employing delay lines and stepwise control of scanning RF signal power, as described above, method 800 may be employed in a feedback or iterative fashion to tweak the range and phase of the various sensors 200 to further reduce or eliminate any areas of no or poor coverage, and further to optimize the amount of time needed to perform routine inventory scans of brick and mortar store 120.

Figure 9:
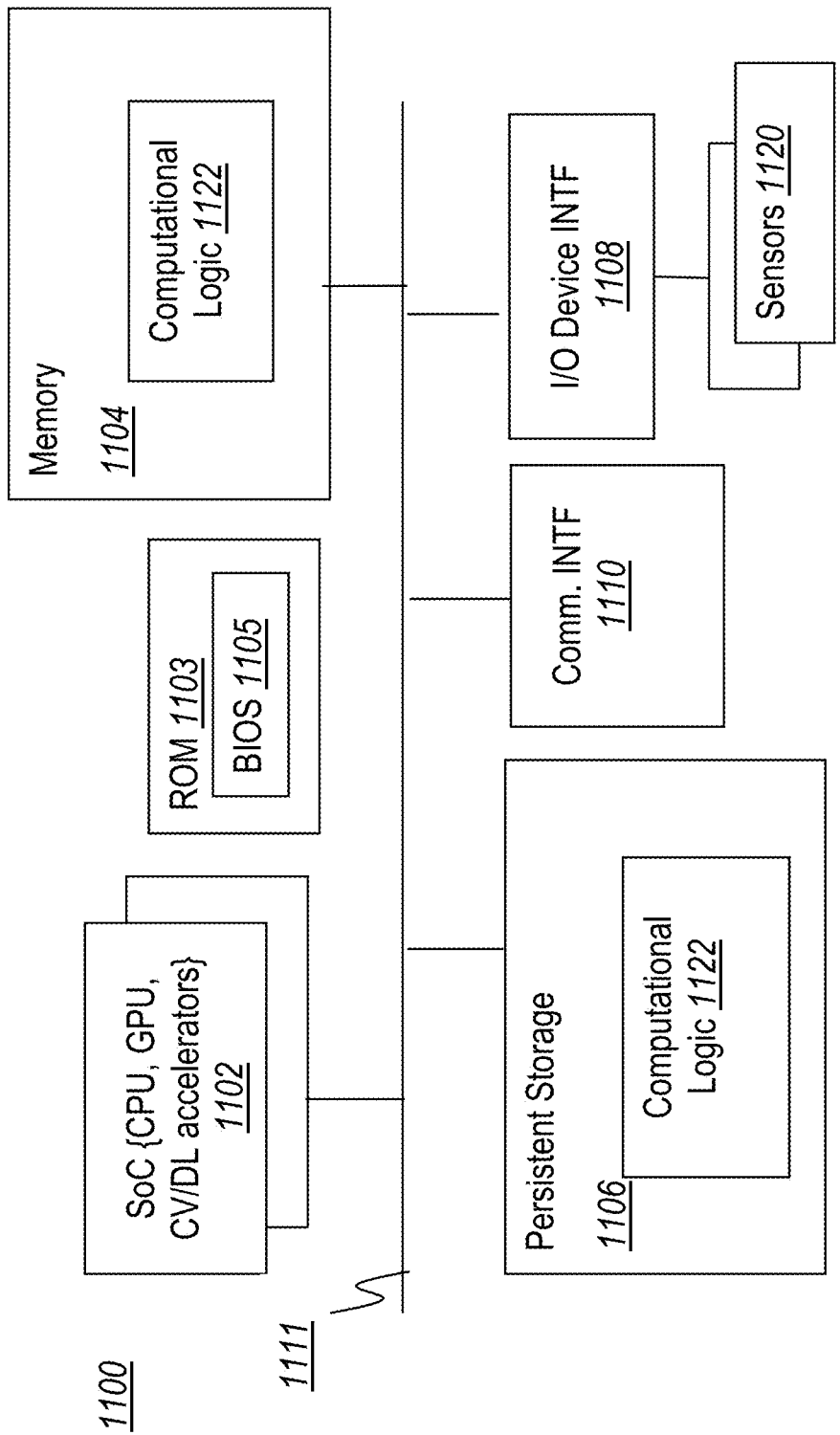
FIG. 9 illustrates a hardware component view of the system for autonomous calibration of RFID sensors, according to various embodiments.

Referring now to FIG. 9, an example computing platform that may be suitable for use to practice the present disclosure, according to various embodiments, is illustrated. As shown, computing platform 1100, which may be gateway 150, or mobile sensor 400, may include one or more system-on-chips (SoCs) 1102, ROM 1103 and system memory 1104. Each SoCs 1102 may comprise or include one or more processor cores (CPUs), one or more graphics processor units (GPUs), and/or one or more accelerators, such as computer vision (CV) and/or deep learning (DL) accelerators. Although denoted as an SoC, SoC 1102 may, in some embodiments, comprise a discrete processor such as a CPU, GPU, or accelerator, which may be coupled to any supporting hardware, such as a southbridge, northbridge, and/or other supporting circuitry. ROM 1103 may include basic input/output system services (BIOS) 1105. CPUs, GPUs, and CV/DL accelerators may be any one of a number of these elements known in the art. Similarly, ROM 1103 and BIOS 1105 may be any one of a number of ROM and BIOS known in the art, and system memory 1104 may be any one of a number of volatile storage known in the art.

Additionally, computing platform 1100 may include persistent storage devices 1106. Example of persistent storage devices 1106 may include, but are not limited to, flash drives, hard drives, compact disc read-only memory (CD-ROM) and so forth. Further, computing platform 1100 may include one or more input/output (I/O) interfaces 1108 to interface with one or more I/O devices, such as sensors 1120, which may be sensors 200, combination tags 300, or sensors 500. Other example I/O devices may include, but are not limited to, display, keyboard, cursor control and so forth. Computing platform 1100 may also include one or more communication interfaces 1110 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 1111, which may represent one or more buses. In the case of multiple buses, they may be bridged by one or more bus bridges (not shown).

Each of these elements may perform its conventional functions known in the art. In particular, ROM 1103 may include BIOS 1105 having a boot loader. System memory 1104 and mass storage devices 1106 may be employed to store a working copy and a permanent copy of the programming instructions implementing the operations associated with method 800, as well as any firmware or logic implementing functions of gateway 150, or mobile sensor 400. The various elements may be implemented by assembler instructions supported by processor core(s) of SoCs 1102 or high-level languages, such as, for example, C, that can be compiled into such instructions.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 10 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1202 may include a number of programming instructions 1204. Programming instructions 1204 may be configured to enable a device, e.g., computing platform 1100, in response to execution of the programming instructions, to implement (aspects of) gateway 150, or mobile sensor 400, as well as some or all operations of method 800. In alternate embodiments, programming instructions 1204 may be disposed on multiple computer-readable non-transitory storage media 1202 instead. In still other embodiments, programming instructions 1204 may be disposed on computer-readable transitory storage media 1202, such as, signals.

Any combination of one or more computer usable or computer readable medium(s) may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

The following examples pertain to further embodiments.

Example 1 includes an apparatus for autonomous sensor placement discovery in a brick and mortar store, comprising a sensor disposed at the brick and mortar store to detect both RFID tags and locating tags, wherein the sensor scans for one or more locating tags within a range external to the apparatus, and receives signals from the one or more external locating tags within the range; a transceiver coupled with the sensor, to communicate detection(s) of the one or more external locating tags to a gateway or edge device; and a locating tag co-disposed with the sensor at the brick and mortar store to transmit a signal for detection by another sensor, wherein the detection of the signal of the co-disposed locating tag by the other sensor is also communicated to the gateway or edge device; wherein the communicated detections are used to autonomously determine sensor placements in the brick and mortar store.

Example 2 includes the subject matter of example 1, or some other example herein, wherein the signals received by the sensor from the one or more external locating tags, and the signal transmitted by the co-disposed locating tag are ultra wideband (UWB) signals.

Example 3 includes the subject matter of example 1 or 2, or some other example herein, wherein the apparatus is affixed at a selected position within the brick and mortar store.

Example 4 includes the subject matter of any of examples 1-3, or some other example herein, wherein the communicated detections are used to determine a position of each of the one or more external locating tags relative to a position of the apparatus.

Example 5 includes the subject matter of any of examples 1-4, or some other example herein, wherein the apparatus is mobile, and further comprises one or more orientation sensors to determine an orientation of the apparatus in space.

Example 6 includes the subject matter of example 5, or some other example herein, wherein information from the one or more orientation sensors and a signal received from an RFID tag are used to determine a position of the RFID tag relative to the apparatus.

Example 7 includes the subject matter of any of examples 1-6, or some other example herein, wherein the apparatus further comprises a switchable delay line to adjust a RF signal phase.

Example 8 includes the subject matter of any of examples 1-7, or some other example herein, wherein RF signal power from the RFID sensor is adjustable.

Example 9 includes the subject matter of any of examples 1-8, or some other example herein, wherein the apparatus further comprises a video camera co-disposed with the sensor and coupled to the transceiver to detect a visual signal emitted by a locating tag.

Example 10 includes an apparatus for autonomous sensor placement discovery in a brick and mortar store, comprising a RFID tag; and a locating tag, wherein the locating tag is to transmit an ultra wideband (UWB) signal, the UWB signal useable for determining a position of the apparatus within the brick and mortar store.

Example 11 includes the subject matter of example 10, or some other example herein, wherein the locating tag is to transmit the UWB signal in response to being scanned by a sensor.

Example 12 includes the subject matter of example 10 or 11, or some other example herein, wherein the device is to generate a visual signal when the apparatus is scanned by a sensor, the visual signal detectable by a video camera co-located with the sensor.

Example 13 includes the subject matter of example 12, or some other example herein, wherein the visual signal comprises a lamp.

Example 14 includes an apparatus for autonomous sensor placement discovery in a brick and mortar store, comprising a receiver to receive signals from a plurality of locating tags when scanned by at least one of a plurality of sensors, wherein the plurality of locating tags are external to the plurality of sensors, and the signals indicate detection of each of the plurality of locating tags; and a coverage mapper coupled to the receiver to autonomously determine, based upon received signals from the plurality of locating tags, the presence and location of areas within a brick and mortar store not scanned by at least one of the plurality of sensors, wherein each sensor is located at a fixed position within the brick and mortar store, and the coverage mapper is to display the location of each of the plurality of locating tags relative to the plurality of sensors based upon the received signals.

Example 15 includes the subject matter of example 14, or some other example herein, wherein the fixed position of each sensor is to be determined by the coverage mapper with a locating tag co-disposed upon the sensor.

Example 16 includes the subject matter of example 14 or 15, or some other example herein, wherein the coverage mapper is to generate a visual depiction of the brick and mortar store, the depiction to show the areas within the brick and mortar store not scanned by at least one of the plurality of sensors.

Example 17 includes the subject matter of any of examples 14-16, or some other example herein, wherein the receiver further receives signals from a non-fixed/mobile sensor that includes a locating tag, the coverage mapper to use the signals from the non-fixed/mobile sensor to determine the boundaries of areas not scanned by at least one of the plurality of sensors.

Example 18 includes the subject matter of any of examples 14-17, or some other example herein, wherein the coverage mapper is to calculate the location of each of the plurality of locating tags from the received signals.

Example 19 includes the subject matter of any of examples 14-18, or some other example herein, wherein the coverage mapper is to receive the location of each of the plurality of locating tags as part of the received signals, the location calculated by at least one of the plurality of sensors.

Example 20 includes the subject matter of any of examples 14-19, or some other example herein, wherein the receiver is to cause each of the plurality of scanners to initiate a scan.

Example 21 includes the subject matter of example 20, or some other example herein, wherein the receiver is to further cause each of the plurality of scanners to adjust a power of a scanning signal in response to the determined location of the areas within the brick and mortar store not scanned by at least one of the plurality of sensors.

Example 22 includes a method, comprising providing a plurality of sensors, each of the plurality of sensors located at a fixed position within a brick and mortar store; providing a plurality of locating tags within the brick and mortar store, each of the plurality of locating tags to emit signals indicating detection of the locating tag; scanning, with the plurality of sensors, for each of the plurality of locating tags; determining the locations of the plurality of locating tags relative to each of the plurality of sensors, using signals received from the plurality of locating tags in response to the scanning; and determining, based on the locations of the plurality of locating tags, the presence and location of areas within the brick and mortar store not scanned by at least one of the plurality of sensors.

Example 23 includes the subject matter of example 22, or some other example herein, wherein at least one of the plurality of sensors includes a switchable delay line to change an RF signal phase from the at least one sensor relative to an RF signal phase from a second one of the plurality of sensors, and the method further comprises switching the switchable delay line in the at least one of the plurality of sensors.

Example 24 includes the subject matter of example 22 or 23, or some other example herein, wherein at least one of the plurality of sensors can adjust RF signal power to limit the distance the at least one sensor can scan RFID tags, and further comprising increasing the RF signal power of the at least one sensor in a stepwise fashion to scan RFID tags that are at a successively further distance from the at least one sensor.

Example 25 includes the subject matter of example 24, or some other example herein, further comprising instructing scanned RFID tags to discontinue responding to subsequent scans.

Example 26 includes a non-transitory computer-readable medium comprising instructions that, when executed by a processor, cause the processor to scan, with a plurality of sensors, for each of a plurality of locating tags located within a brick and mortar store; receive signals from the plurality of locating tags in response to the scan, the signals indicating detection of each of the plurality of locating tags; and determine a location of areas within the brick and mortar store not scanned by at least one of the plurality of sensors based on the locations of the subset of the plurality of locating tags, the locations determined by the signals, wherein each of the plurality of sensors is located at a fixed location within the brick and mortar store.

Example 27 includes the subject matter of example 26, or some other example herein, wherein the instructions are to further cause the processor to determine the fixed position of each sensor with a locating tag co-disposed upon the sensor.

Example 28 includes the subject matter of example 26 or 27, or some other example herein, wherein the instructions are to further cause the processor to generate a visual depiction of the brick and mortar store, the depiction to show the areas within the brick and mortar store not scanned by at least one of the plurality of sensors.

Example 29 includes the subject matter of any of examples 26-28, or some other example herein, wherein the instructions are to further cause the processor to receive signals from a non-fixed/mobile sensor that includes a locating tag, and use the signals from the non-fixed/mobile sensor to determine the boundaries of areas not scanned by at least one of the plurality of sensors.

Example 30 includes the subject matter of any of examples 26-29, or some other example herein, wherein the instructions are to further cause the processor to calculate the location of each of the plurality of locating tags from the received signals.

Example 31 includes the subject matter of any of examples 26-30, or some other example herein, wherein the instructions are to further cause the processor to receive the location of each of the plurality of locating tags as part of the received signals, the location calculated by at least one of the plurality of sensors.

Example 32 includes the subject matter of any of examples 26-31, or some other example herein, wherein the instructions are to further cause the processor to cause each of the plurality of scanners to initiate a scan.

Example 33 includes the subject matter of example 32, or some other example herein, wherein the instructions are to further cause the processor to further cause each of the plurality of scanners to adjust a power of a scanning signal in response to the determined location of the areas within the brick and mortar store not scanned by at least one of the plurality of sensors.

Example 34 includes a system, comprising gateway means to receive signals from a plurality of locating tags when scanned by at least one of a plurality of sensors; and mapping means to map, based upon signals received by the plurality of sensors from at least a subset of the plurality of locating tags, the presence and location of areas within a brick and mortar store not scanned by at least one of the plurality of sensors, wherein each sensor is located at a fixed position within the brick and mortar store, and the mapping means is to use the received signals to determine the location of each of the plurality of locating tags relative to the plurality of sensors.

Example 35 includes the subject matter of example 34, or some other example herein, wherein the fixed position of each sensor is to be determined by the mapping means with a locating tag co-disposed upon the sensor.

Example 36 includes the subject matter of example 34 or 35, or some other example herein, wherein the mapping means is to generate a visual depiction of the brick and mortar store, the depiction to show the areas within the brick and mortar store not scanned by at least one of the plurality of sensors.

Example 37 includes the subject matter of any of examples 34-36, or some other example herein, wherein the gateway means further receives signals from a non-fixed/mobile sensor that includes a locating tag, the mapping means to use the signals from the non-fixed/mobile sensor to determine the boundaries of areas not scanned by at least one of the plurality of sensors.

Example 38 includes the subject matter of any of examples 34-37, or some other example herein, wherein the mapping means is to calculate the location of each of the plurality of locating tags from the received signals.

Example 39 includes the subject matter of any of examples 34-38, or some other example herein, wherein the mapping means is to receive the location of each of the plurality of locating tags as part of the received signals, the location calculated by at least one of the plurality of sensors.

Example 40 includes the subject matter of any of examples 34-39, or some other example herein, wherein the gateway means is to cause each of the plurality of scanners to initiate a scan.

Example 41 includes the subject matter of example 40, or some other example herein, wherein the gateway means is to further cause each of the plurality of scanners to adjust a power of a scanning signal in response to the determined location of the areas within the brick and mortar store not scanned by at least one of the plurality of sensors.

Example 42 includes the subject matter of any of examples 1-9, or some other example herein, wherein the transceiver is integrated with the sensor, co-disposed with the sensor, or disposed at the brick and mortar store, and is coupled to the sensor either with a wired or wireless communication link.

What is claimed is:

1. An apparatus for autonomous sensor placement discovery in a brick and mortar store, comprising:
    a sensor disposed at the brick and mortar store to detect both radio-frequency identification (RFID) tags and locating tags, wherein the sensor scans for one or more locating tags within a range external to the apparatus, and receives radio frequency (RF) signals from the one or more external locating tags within the range;
    a transceiver coupled with the sensor, to communicate detection(s) of the one or more external locating tags to a gateway or edge device; and
    a locating tag co-disposed with the sensor at the brick and mortar store to transmit an RF signal for detection by another sensor, wherein the detection of the RF signal of the co-disposed locating tag by the other sensor is also communicated to the gateway or edge device;
    wherein the communicated detections are used to autonomously determine sensor placements in the brick and mortar store, and
    wherein the apparatus further includes circuitry to adjust a phase of the RF signal relative to a second RF signal emitted by the other sensor.

2. The apparatus of claim 1, wherein the signals received by the sensor from the one or more external locating tags, and the signal transmitted by the co-disposed locating tag, are ultra wideband (UWB) signals.

3. The apparatus of claim 1, wherein the apparatus is affixed at a selected position within the brick and mortar store.

4. The apparatus of claim 1, wherein the communicated detections are used to determine a position of each of the one or more external locating tags relative to a position of the apparatus.

5. The apparatus of claim 1, wherein the apparatus is mobile, and further comprises one or more orientation sensors to determine an orientation of the apparatus in space.

6. The apparatus of claim 5, wherein information from the one or more orientation sensors and a signal received from an RFID tag are used to determine a position of the RFID tag relative to the apparatus.

7. The apparatus of claim 1, wherein the circuitry further comprises a switchable delay line to adjust the RF signal phase.

8. The apparatus of claim 7, wherein the circuitry further is to adjust an RF signal power from the RFID sensor.

9. The apparatus of claim 1, wherein the apparatus further comprises a video camera co-disposed with the sensor and coupled to the transceiver to detect a visual signal emitted by a locating tag.

10. The apparatus of claim 1, wherein the transceiver is integrated with the sensor, co-disposed with the sensor, or disposed at the brick and mortar store, and is coupled to the sensor either with a wired or wireless communication link.

11. An apparatus for autonomous sensor placement discovery in a brick and mortar store, comprising:
    a radio-frequency identification (RFID) tag; and
    a locating tag,
    wherein the locating tag is to transmit an ultra wideband (UWB) signal, the UWB signal useable for determining a position of the apparatus within the brick and mortar store, and
    wherein the RFID tag and the locating tag are jointly housed in a combination tag, and
    wherein the apparatus further includes circuitry to adjust a phase of the UWB signal relative to an RF signal emitted by another sensor within range of the apparatus.

12. The apparatus of claim 11, wherein the locating tag is to transmit the UWB signal in response to being scanned by a sensor.

13. The apparatus of claim 11, wherein the device is to generate a visual signal when the apparatus is scanned by a sensor, the visual signal detectable by a video camera co-located with the sensor.

14. A method, comprising:
    providing a plurality of sensors, each of the plurality of sensors located at a fixed position within a brick and mortar store;
    providing a plurality of locating tags within the brick and mortar store, each of the plurality of locating tags to emit radio frequency (RF) signals responsive to scanning RF signals from the plurality of sensors to indicate detection of the locating tag;
    emitting, by the plurality of sensors, the scanning RF signals;
    scanning, with the plurality of sensors, for each of the plurality of locating tags;
    determining the locations of the plurality of locating tags relative to each of the plurality of sensors, using the responsive RF signals received from the plurality of locating tags in response to the scanning RF signals;
    determining, based on the locations of the plurality of locating tags, a presence and location of areas within the brick and mortar store not scanned by at least one of the plurality of sensors; and
    switching a phase of at least a first scanning RF signal of a first of the plurality of sensors relative to a second scanning RF signal of a second of the plurality of sensors.

15. The method of claim 14, wherein the first of the plurality of sensors includes a switchable delay line to change the RF signal phase from the first of the plurality of sensors relative to the RF signal phase from the second of the plurality of sensors, and the method further comprises:
    switching the switchable delay line in the first of the plurality of sensors.

16. The method of claim 14, wherein at least one of the plurality of sensors can adjust RF signal power to limit a distance the at least one sensor can scan RFID tags, and further comprising increasing the RF signal power of the at least one sensor in a stepwise fashion to scan RFID tags that are at a successively farther distance from the at least one sensor.

17. The method of claim 16, further comprising instructing scanned RFID tags to discontinue responding to subsequent scans.

\* \* \* \* \*